(12) United States Patent
Flansburg et al.

(10) Patent No.: US 6,663,774 B2
(45) Date of Patent: Dec. 16, 2003

(54) CENTRIFUGE SCREEN

(75) Inventors: Chuck Flansburg, Andover, MN (US); Pierre Ducloux, Minneapolis, MN (US); Michael D. Appel, Mahtomedi, MN (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/978,840

(22) Filed: Oct. 16, 2001

(65) Prior Publication Data

US 2002/0084216 A1 Jul. 4, 2002

Related U.S. Application Data

(60) Provisional application No. 60/240,784, filed on Oct. 16, 2000.

(51) Int. Cl.⁷ .................. B01D 25/00; B01D 33/27; B04B 1/08; B04B 7/16
(52) U.S. Cl. ............... 210/360.1; 210/380.1; 210/497.01; 210/497.3; 129/19
(58) Field of Search ............... 210/359, 360.1, 210/369, 380.1, 402, 497.01, 497.3, 483, 484; 127/19

(56) References Cited

U.S. PATENT DOCUMENTS

| | | | | |
|---|---|---|---|---|
| 144,752 | A | * 11/1873 | Fischer ................ 210/368 |
| 635,770 | A | 10/1899 | Graner | |
| 3,682,310 | A | * 8/1972 | Valdespino ............ 210/140 |
| 3,955,754 | A | 5/1976 | Schaper | |
| 3,980,563 | A | * 9/1976 | Greutert et al. ........ 210/232 |
| 3,993,243 | A | 11/1976 | Dietzel et al. | |
| 4,052,304 | A | * 10/1977 | Vertenstein ............ 127/19 |
| 4,063,959 | A | 12/1977 | Dietzel et al. | |
| 4,072,266 | A | 2/1978 | Dietzel | |
| 4,133,770 | A | 1/1979 | Mercier | |
| 4,157,966 | A | 6/1979 | Hassall | |
| 4,158,573 | A | 6/1979 | Hentschel et al. | |
| 4,259,136 | A | 3/1981 | Spiewok | |
| 4,308,075 | A | 12/1981 | Hentschel et al. | |
| 4,313,992 | A | 2/1982 | Spiewok | |
| 4,352,451 | A | 10/1982 | Journet | |
| 4,487,695 | A | * 12/1984 | Connolly ............. 210/380.1 |
| 4,523,993 | A | * 6/1985 | Farber ................. 210/297 |
| 4,762,570 | A | * 8/1988 | Schaper ................ 127/19 |
| 4,922,625 | A | 5/1990 | Farmer | |
| 5,182,008 | A | * 1/1993 | Shelstad .............. 210/139 |
| 5,221,469 | A | * 6/1993 | Nehls ................. 210/232 |
| 5,370,796 | A | * 12/1994 | Grimwood ............. 210/360.1 |
| 5,472,095 | A | * 12/1995 | Malm ................. 209/303 |
| 5,601,712 | A | * 2/1997 | Adams et al. .......... 210/297 |
| 5,618,352 | A | 4/1997 | Ebeling et al. | |
| 5,705,069 | A | * 1/1998 | Nagaoka .............. 210/369 |
| 5,720,880 | A | 2/1998 | Milner et al. | |
| 6,033,564 | A | * 3/2000 | Kirker et al. .......... 210/232 |
| 6,267,899 | B1 | * 7/2001 | Greig et al. .......... 210/781 |

FOREIGN PATENT DOCUMENTS

GB      2033242      *  5/1980

OTHER PUBLICATIONS

U.S. Filter Johnson Screens, Rugged, Dependable Screens for Mineral Processing, Apr. 1998, New Brighton, MN.

* cited by examiner

*Primary Examiner*—Fred G. Prince
(74) *Attorney, Agent, or Firm*—Moser, Patterson & Sheridan, L.L.P.

(57) ABSTRACT

A centrifuge screen includes a series of support rods supporting and underlying a series of filter wires. The filter wires have a triangular cross-section and are less than 0.030 inches in cross-sectional width. The filter wires are spaced less than 0.010 inches apart. The screen is a fine opening, high open area screen for use in a centrifuge to separate particulate matter from a liquid.

18 Claims, 4 Drawing Sheets

CENTRIFUGE SCREEN

CROSS-REFERENCE TO RELATED APPLICATIONS

This application claims priority under 35 U.S.C. §119 to provisional patent application No. 60/240,784 filed on Oct. 16, 2000.

BACKGROUND AND SUMMARY OF THE INVENTION

For example, the present invention relates to filtering devices, and particularly to centrifuges which utilize a screen to separate a solid from a liquid. More particularly, the present invention relates to centrifuges having screens which separate fine, particulate matter out of a liquid.

A conventional sugar refining process employs a centrifuge to separate sugar crystals out of raw molasses. The centrifuge includes a spinning drum having a truncated conical basket, which tapers towards its bottom. The walls of the truncated conical basket are lined with a screen material. In a typical sugar refining process, a raw molasses product containing sugar crystals is poured into the center of a centrifuge spinning at a very high rate—e.g. 1750 rpm. As the raw product containing sugar crystals is poured into the center of the centrifuge, centrifugal force pushes the raw molasses through the screen material, through the basket, and out of the centrifuge. However, the sugar crystals are too big to pass through the screen and are left behind. As the raw molasses pass through the screen, the spinning of the centrifuge forces the sugar crystals up the walls of the centrifuge. The sugar crystals work their way up the screen, eventually passing up and over the perimeter of the screen. In this way, sugar crystals are filtered out of liquid raw molasses product and are collected as they pass over the lip of the spinning screen.

To separate sugar crystals from raw product, the screen employed must be very fine. That is, the openings in the screen must be very small to prevent the sugar crystals from passing through the screen along with the liquid, raw molasses. Conventional sugar processing screens have been formed by "etching" a very thin metal plate. A metal plate may be etched with openings sized small enough to separate sugar crystals from liquid molasses. For example, a metal plate may be etched with a laser to form very small slits in the plate. The plate is then formed into a conical shape which fits within the walls of a centrifuge basket.

The greater the number of slits cut into a conventional sugar processing screen, the greater the "open area" of the screen. A large number of slits, spaced closely together, produces a relatively large "open area" in the screen, which increases the screen's production. However, the slits in a typical sugar processing screen weaken the overall screen and subject it to fatigue. Additionally, sugar crystals may lodge in the slits of a conventional sugar processing screen, thereby reducing its performance. A sugar processing device having a screen which is durable and has a fine opening, high open area would be welcomed by those in the sugar processing industry. Additionally, other industries that utilize such processes as coal dewatering and driller mud dewatering, etc. would welcome a fine opening, high open area centrifuge screen.

According to the present invention, a centrifuge screen comprises a series of fine filter wires spaced closely together and mounted generally perpendicularly to a series of underlying support rods.

In preferred embodiments, the filter wires have a V-shaped profile with a width of approximately 0.020 inches. The mating points of the support rods also have a V-shaped profile with a width of approximately 0.060 inches. The filter wires are spaced approximately 0.0035 inches apart and the support rods are spaced approximately 0.38 inches apart. However, it will be understood by one of ordinary skill in the art that different dimensions may be used to create a fine opening, high open area centrifuge screen used, for example, to separate crystalline sugar from liquid raw molasses.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
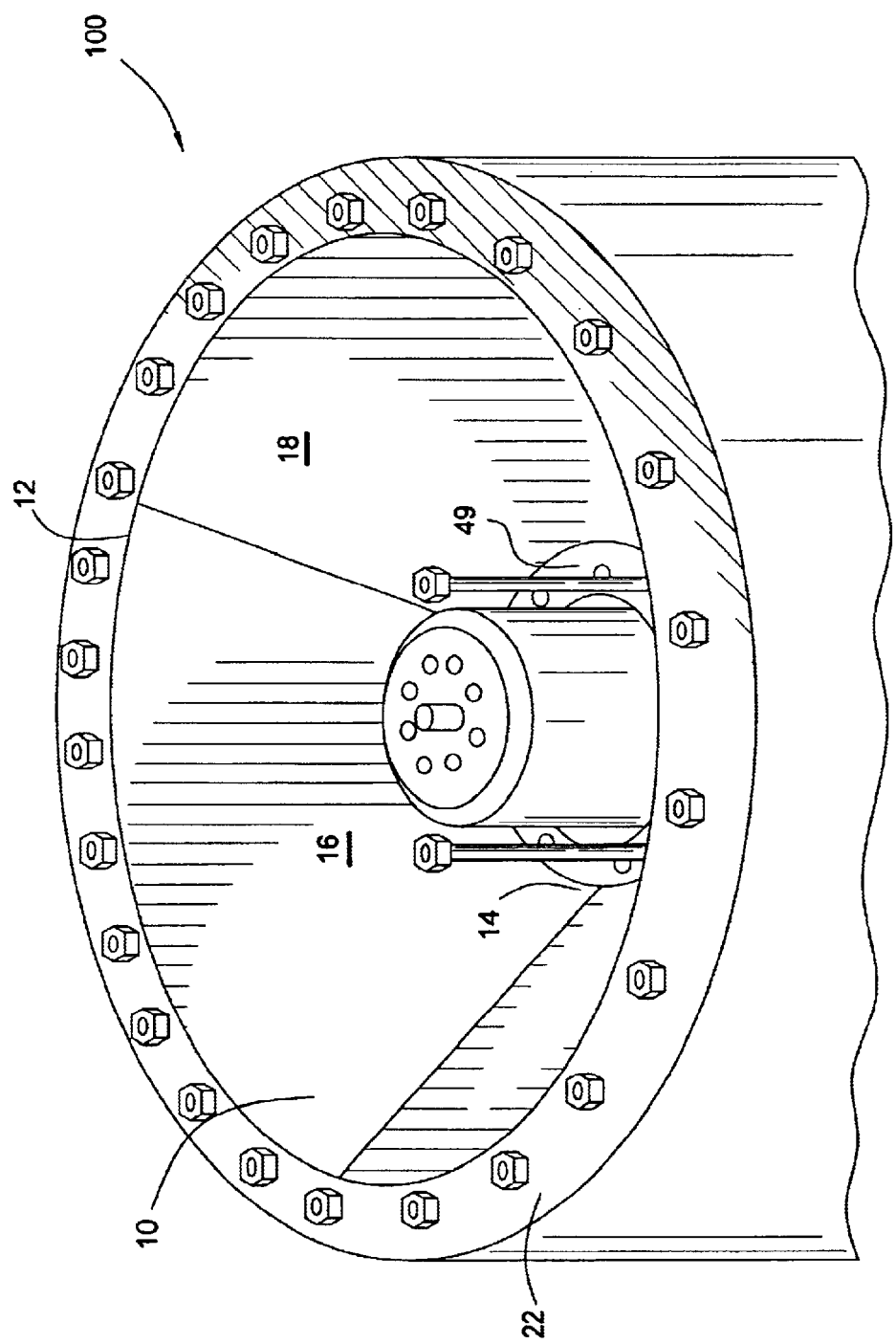
FIG. 1 is a perspective view of a centrifuge screen in accordance with the present invention within a sugar processing device having a centrifuge drum.

As shown in FIG. 1, a fine opening, high open area screen 10 in accordance with the present invention is shown in a sugar processing or refining device 100. The screen 10 is generally conical and has an upper rim 12, a lower rim 14, and a sidewall 16 extending from the upper rim 12 to the lower rim 14. The sidewall 16 has an inner surface 18 and an outer surface 20, best seen in FIG. 4. Referring back to FIG. 1, the conical shape of the screen 10 dictates that the sidewall 16 taper from the upper rim 12 to the lower rim 14, with the circumference of the upper rim 12 being approximately two and a half times the circumference of the lower rim 14.

The screen 10 is nested within a centrifuige drum 22 of the sugar processing device 100. The drum 22 includes a perforated, conical basket 26 (hidden from view in FIG. 1, shown in FIG. 8, as will be discussed below) underlying and supporting the conical screen 10. During sugar processing, liquid, raw molasses containing sugar crystals (not shown) are poured into the center of the centrifuge drum 22. The molasses are poured into the centrifuge drum 22 while it is spinning rapidly. In this way, the raw molasses are forced outward against the inner surface 18 of the sidewall 16 of the screen 10. The molasses are first forced against the sidewall 16 near the lower rim 14 of the screen 10. However, because the inner surface 18 is slanted from the lower rim 14 to the upper rim 12, the molasses "crawl" their way up the inner surface 18 as they are forced outward and through the screen 10. As the centrifuge drum 22 spins, the liquid raw molasses are forced through the screen 10, leaving sugar crystals behind. Because not all of the liquid, raw molasses can flow through the screen instantaneously, some of the molasses crawl up the inner surface 18 of the screen 10 before being forced through the screen 10. The greater the open area of the screen 10, the quicker the molasses flow through the screen 10 and the less they crawl up the inner surface 18. In any case, at some point between the lower rim 14 and the upper rim 12, the liquid raw molasses will have been filtered entirely through the screen 10, leaving only crystalline sugar on the inner surface 18 of the screen 10. The spinning of the centrifuge drum 22 causes the sugar crystals to continue to ride up the inner surface 18. While the liquid molasses can flow through the screen 10, the sugar crystals are too large to pass through. When the sugar crystals reach the upper rim 12, they are ejected out of the drum 22 and are collected around the perimeter of the drum 22.

Figure 5:
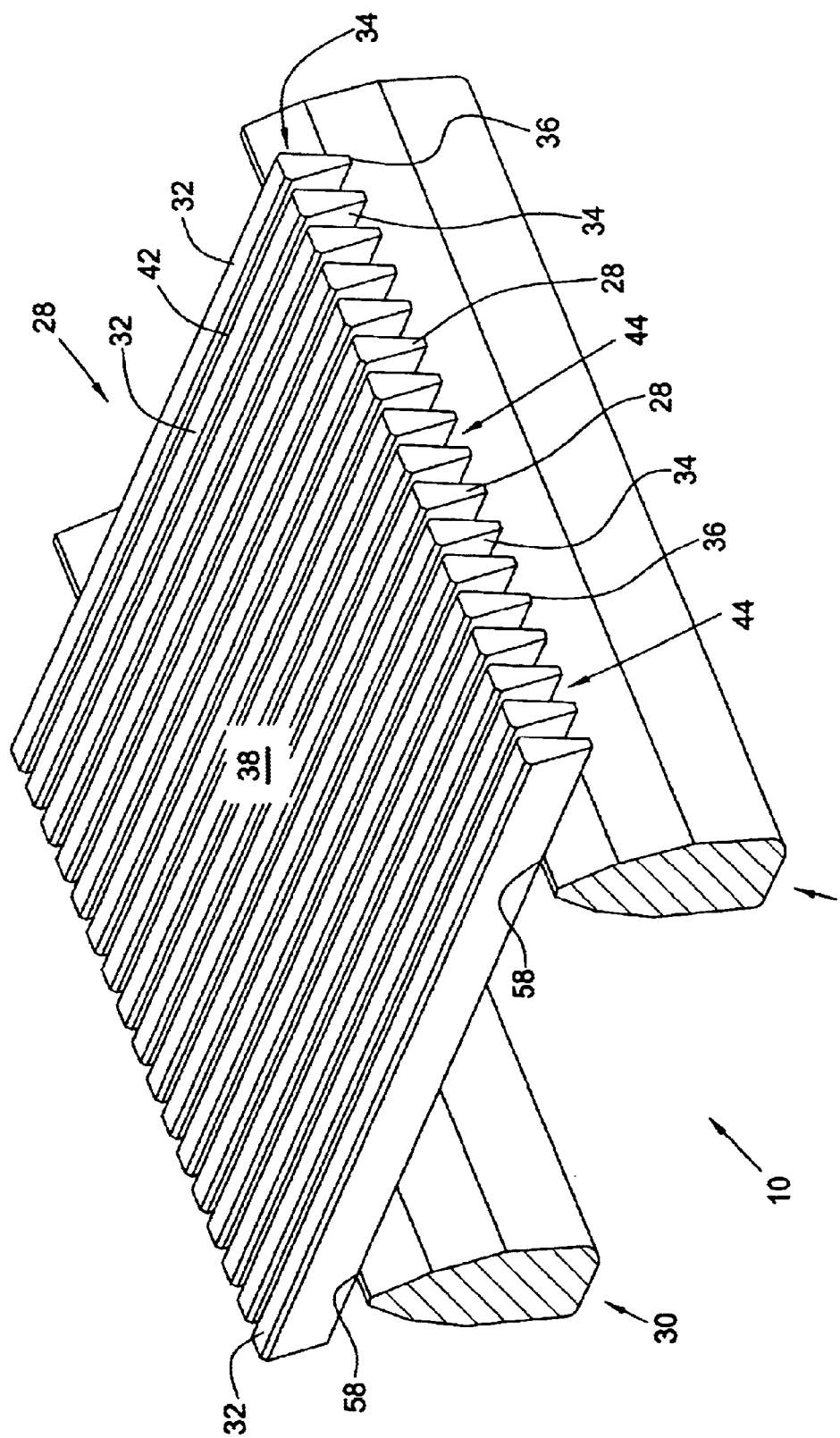
FIG. 5 is a perspective, detailed view of a section of the screen of FIG. 1, with portions broken away.

As mentioned above, the screen 10 allows a liquid, for example raw molasses, to pass though it, while filtering out fine particulate matter, for example crystalline sugar suspended in the molasses. As best seen in FIG. 5, the screen 10 is constructed of filter wires 28 in close, generally parallel relation to one another mounted on support rods 30. The filter wires 28 and support rods 30 are each a V-shaped profile wire, connoting that they each have a generally triangular-shaped cross-section. The filter wires 28 are mounted generally perpendicular to the support rods 30. Each filter wire 28 includes a face surface 32 and two side surfaces 34 which converge to a point 36. The filter wires 28 are aligned, side-by-side, with their face surfaces 32 lying in a plane 38, which, as will be further discussed below, creates the inner surface 18 of the screen 10.

The screen 10 is constructed by inserting a number of support rods 30 into a series of notches equally spaced around the circumference of a specially designed wheel (not shown). In the case of the V-shaped profile rods 30, the notches in the wheel would also be generally triangular in shape. In this way, the support rods are secured around the wheel and extend substantially perpendicularly to the wheel to create a cylinder of support rods 30. The wheel, and thus the cylinder of rods 30, is then rotated and a filter wire 28 is continuously and spirally wrapped around the rotating cylinder of rods 30. At each point 58 where the filter wire 28 intersects a rod 30, an electrical charge is conducted through the intersection 58 and the wheel, thereby welding the filter wire 28 to the rod 30. The result is a screen cylinder formed with longitudinally extending rods 30 spirally-wrapped in a filter wire 28. To create flat sheets of the screen material 10, the resulting cylinder is cut between two support rods 30, along the length of the cylinder. In this way, the spirally-wrapped filter wire 28 is cut at each revolution around the cylinder. The cylinder is then flattened, resulting in a sheet of screen 10, a portion of which is shown in FIG. 5.

Figure 4:
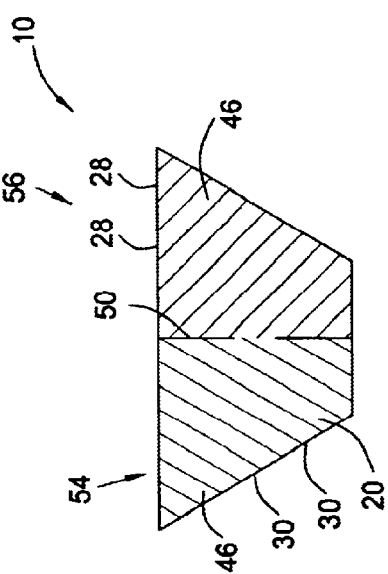
FIG. 4 is a side view of the screen of FIG. 1.

As shown in FIG. 5, in the resulting screen 10, the filter wires 28 are welded generally perpendicularly across the support rods 30 to create a filtering lattice material. In the illustrated embodiment, the face surfaces 32 of the filter wires 28 are 0.020 inches wide and are positioned 0.0035 inches apart from each other to create a filtering gap 42 between consecutive face surfaces 32. However, it will be readily understood by one of ordinary skill in the art that other dimensions may be employed which produce the desired sugar filtering results. The position of the filter wires 28 in relation to the support rods 30 in the complete screen 10 can be seen with reference to FIG. 4, wherein a left screen portion 54 includes the support rods 30 along with the filter wires 28, while a right screen portion 56 illustrates only the filter wires 28. As seen in FIG. 4, the support rods 30 are positioned generally perpendicular to the filter wires 28.

Referring again to FIG. 5, a filter channel 44 is created between opposing side surfaces 34 of consecutive filter wires 28. Because of the triangular shaped cross-section of the filter wires 28, the filter channels 44 between consecutive filter wires 28 open away from the plane 38 defined by the face surfaces 32 of the filter wires 28. Put another way, the filter channels 44 do not have parallel walls, but instead flare from the face surfaces 32 to the points 36 of the filter wires 28.

Figure 3:
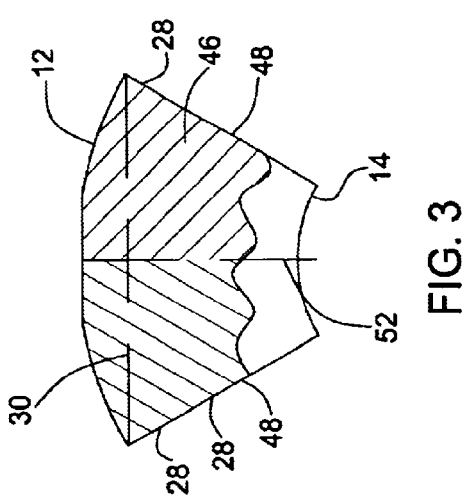
FIG. 3 is a plan view of one segment of the screen of FIG. 1.
Figure 2:
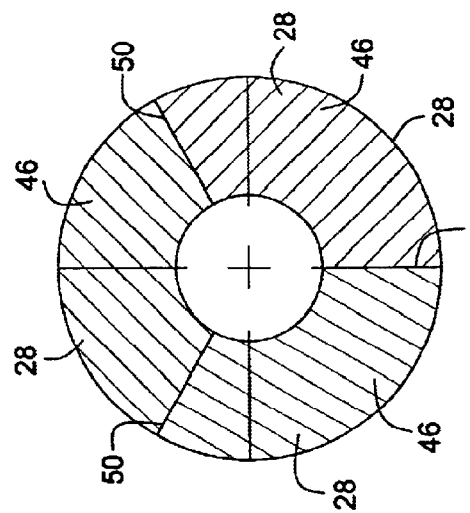
FIG. 2 is a top view of the screen of FIG. 1.

As shown in FIGS. 1–4, the screen 10 is constructed of three arcuate-shaped segments 46. The arcuate-shaped segments 46 are cut out of larger, flat sections of the filtering lattice material constructed as described above. As shown in FIG. 3, in this way, the filtering wires 28 run parallel to each other and toward the upper rim 12 of the segment 46 of screen 10. It will be readily apparent to one of ordinary skill in the art that, while the filter wires 28 extend generally radially in the screen 10, they do not extend truly radially from the lower rim 14 to the upper rim 12 of the screen 10. Truly radially aligned wires would diverge as they extended away from the lower rim 14 of the screen 10. In contrast, the filter wires 28 of the screen 10 of the present invention remain generally parallel, producing filtering gaps 42 of uniform width.

After being cut out of larger portions of the filtering lattice material, the arcuate-shaped screen segments 46 are rolled to match the curvature of the centrifuge basket. Then, the edges 48 of the three segments 46 are joined at screen joints 50 to form the truncated conical shape of the screen 10, as best seen in FIG. 4. The joints 50 are formed by welding the ends of the support rods 30 of one segment 46 to the ends of the support rods 30 of the adjacent segment 46. However, additional arrangements for coupling adjacent segments 46 may be used. For example, a rectangular bar joint (not shown) may be welded down the joint 50 between two consecutive segments 46. Alternatively, a T-bar (also not shown) may be used to hold down the edges 48 of consecutive segments 46. The vertical member of the T-bar may be coupled to the basket which holds the screen 10. The horizontal member of the T-bar would then hold down and guide the edges 48 of the segments 46 and protect the unsupported ends of the filter wires 28. The T-bar may act as a clamping mechanism to hold the screen 10 against the basket. An angle-shaped joint (not shown), oriented as an inverted "L," may also be used to form joints 50. Each screen segment 46 may have one edge 48 welded to the vertical segment of a piece of angle iron. In this way, the horizontal segment of the angle iron overlaps, holds, and protects the edge 48 of the adjacent screen segment 46.

Figure 6:
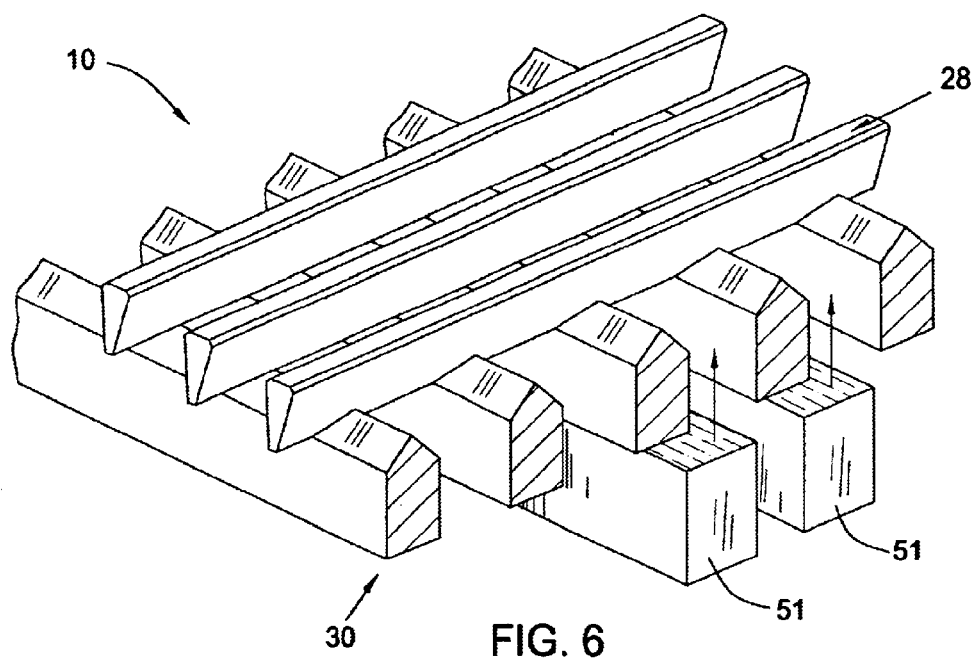
FIG. 6 is a perspective view of the section of screen of FIG. 5, including pieces of rubber being positioned between support rods of the section.
Figure 7:
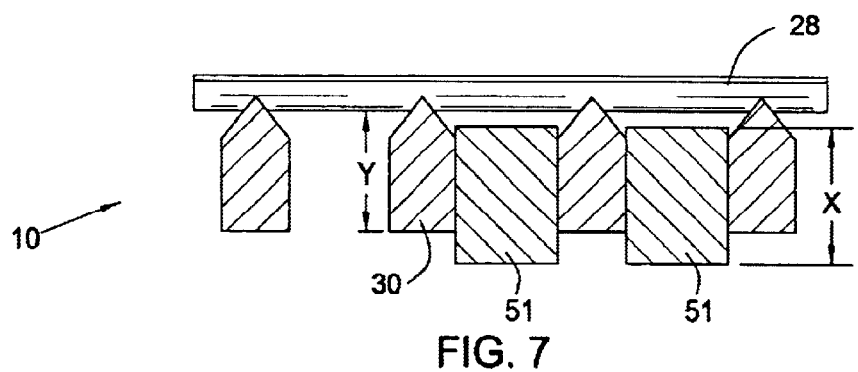
FIG. 7 is a side view of the pieces of rubber being positioned between the support rods of FIG. 6.
Figure 8:
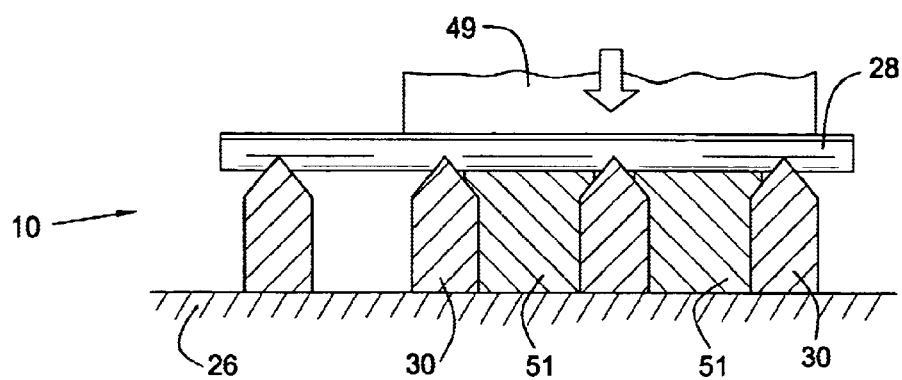
FIG. 8 is a side view of the pieces of rubber positioned between the support rods of FIG. 6.

Referring to FIG. 1, a collar 49 is used to secure the screen 10 within the drum 22. The lower rim 14 of the screen 10 is clamped between the collar 49 and the conical basket 26, shown in FIG. 8. As shown in FIGS. 6–8, to increase friction between the screen 10 and the basket 26, pieces of rubber 51 may be applied between the support rods 30 in those locations directly beneath the collar 49. It will be readily understood by those of ordinary skill in the art that any material that is compressible and has a high coefficient of friction may be used instead of rubber. The pieces of rubber 51 may include adhesive on one or more sides to hold them in place. Referring to FIG. 7, the uncompressed thickness X of the rubber 51 is slightly greater than the exposed height Y of the support rods 30 to ensure that the rubber 51 is in compression when the collar 49 clamps the screen 10 to the basket 26 (FIG. 8).

With the screen 10 formed and shaped as discussed above, at a center 52 of each screen segment 46, the filter wires 28 are generally aligned with the flow of product as it crawls up the inner surface 18 created by the face surfaces 32 of the filter wires 28, and the support rods 30 run generally transverse to the flow. At the joints 50 between the segments 46, the filter wires 28 are less aligned with the flow path of the product because of the way in which the screen segments 46 are cut out of flat sections of the lattice material and roll formed, as described above (See FIG. 4). As liquid product is forced against the screen 10 in the spinning centrifuge drum 22, the liquid, raw molasses flow past filtering gaps 42 and through filtering channels 44. From there, the liquid, raw molasses flow through an annular space created by the support rods 30 between the filter wires 28 and the perforated basket 26 that holds the screen 10. The liquid molasses then continue through the perforations in the perforated basket and out of the sugar refining device 100.

The sugar crystals work their way up the inner surface 18 created by the face surfaces 32 of the filter wires 28. Because of their size, the sugar crystals cannot pass through the filtering gaps 42 between the filter wires 28. Instead, the sugar crystals pass up the inner surface 18 of the screen 10 and are ejected over the upper rim 12 of the screen 10, where they are collected.

As will be readily apparent to those of ordinary skill in the art, the present invention as described above and illustrated in FIGS. 1–8 may be used in a number of applications in which a fine opening, high open area centrifuge screen is used to separate a solid from a liquid, such as, but not limited to, sugar processing, coal dewatering, driller mud dewatering, etc.

Although the invention has been described in detail with reference to certain preferred embodiments, variations and modifications exist within the scope and spirit of the invention as described and defined in the following claims.

We claim:

1. A centrifuge screen for insertion within a rotating centrifuge drum, the screen comprising:
   a conical sidewall extending from a lower rim to an upper rim of the screen, the lower rim having a diameter that is less than a diameter of the upper rim, the sidewall comprising three arcuate-shaped screen segments,
   wherein each of the screen segments includes a plurality of filter wires, at least two of which are spaced apart and substantially parallel toward the upper rim, the filter wires having a cross-sectional width of less than 0.030 inches and being spaced apart by a dimension which is less than the cross-sectional width of the wires, and a plurality of transversely extending support rods intersecting the plurality of wires, at least two of the support rods being substantially parallel.

2. The screen of claim 1, wherein the filter wires have a cross sectional width of about 0.020 inches.

3. The screen of claim 2, wherein the filter wires are spaced apart by less than 0.010 inches.

4. The screen of claim 3, wherein the transversely extending support rods are substantially perpendicular to the filter wires.

5. The screen of claim 4, wherein the filter wires are welded to the transversely extending support rods.

6. A centrifuge for separating particulate matter from a liquid, the centrifuge comprising:
   a rotating drum;
   a conical support basket positioned within the drum and rotatable with the drum; and
   a conical screen lining the support basket, the conical screen having an upper and a lower rim, the upper rim having a diameter greater than a diameter of the lower rim, the conical screen comprising at least two screen segments coupled together to form a sidewall of the screen extending from the lower rim to the upper rim, each screen segment including:
      a plurality of substantially parallel filter wires;
      a plurality of substantially parallel support rods supporting the plurality of substantially parallel filter wires; and
      a resilient member positioned between at least two of the support rods.

7. The centrifuge of claim 6, wherein at least one filter wire has a triangular-shaped cross-section.

8. The centrifuge of claim 6, wherein at least one support rod has a triangular-shaped cross-section.

9. The centrifuge of claim 6, wherein the piece of rubber, when uncompressed, extends away from the filter wires to an extent beyond that of the support rods.

10. The centrifuge of claim 6, wherein the resilient member comprises a rubber material.

11. A sugar processing device comprising:
    a drum for receiving a liquid containing sugar crystals;
    a driving assembly for causing rotation of the drum;
    a screen housed in the drum for filtering sugar crystals from the liquid during rotation of the drum, the screen including,
       a conical sidewall extending from a lower rim to an upper rim of the screen, the lower rim having a diameter that is less than a diameter of the upper trim, the sidewall comprising a plurality of wires arranged in mutually parallel relation, the wires having a cross-sectional width of less than 0.030 inches and spaced apart by a dimension which is less than the cross-sectional width of the wires, the sidewall further comprising a plurality of transversely extending support rods, at least two of the support rods being substantially parallel.

12. The sugar processing device of claim 11, wherein the wires have a cross sectional width of about 0.020 inches.

13. The sugar processing device of claim 12, wherein the plurality of parallel wires are intersected by the plurality of transversely extending support rods.

14. The sugar processing device of claim 13, wherein the plurality of parallel wires are welded to the transversely extending rods.

15. A processing device for processing a liquid containing sugar crystal, comprising:
    a drum for receiving the liquid;
    a driving assembly for causing rotation of the drum;
    a screen housed in the drum for filtering sugar crystals from the liquid during rotation of the drum, the screen including,
       a conical sidewall extending from a lower rim to an upper rim of the screen, the lower rim having a diameter that is less than a diameter of the upper trim, the sidewall having a plurality of wires arranged in mutually parallel relation, wherein the wires are spaced apart by a dimension which is less than a cross-sectional width of the wires, and a plurality of transversely extending support rods, wherein at least two of the support rods being substantially parallel.

16. The device of claim 15, further comprising a frictional member disposed between two adjacent support rods.

17. The device of claim 15, wherein the conical wall comprises a plurality of screen segments attached to each other.

18. The device of claim 17, wherein the plurality of support rods of adjacent screen segments are not in parallel.

* * * * *